United States Patent [19]

Irons et al.

[11] 4,445,021

[45] Apr. 24, 1984

[54] HEAVY DUTY PLASMA SPRAY GUN

[75] Inventors: Gary C. Irons, Sea Cliff; John F. Klein, Port Washington; Richard D. Lander, Lloyd Harbor; Henry C. Thompson, Huntington Bay; Richard D. Trapani, New York, all of N.Y.

[73] Assignee: Metco, Inc., Westbury, N.Y.

[21] Appl. No.: 292,763

[22] Filed: Aug. 14, 1981

[51] Int. Cl.[3] .............................................. B23K 9/00

[52] U.S. Cl. ...................... 219/121 PM; 219/121 PP; 219/121 PN; 219/121 PL; 239/71; 239/125; 239/132.3

[58] Field of Search .................. 219/121 PN, 121 PP, 219/121 PM, 121 PQ, 121 PL, 76.16, 76.11, 137.62; 239/71, 125, 132, 132.1, 132.3, 79–85

[56] References Cited

U.S. PATENT DOCUMENTS

| | | | |
|---|---|---|---|
| 3,130,292 | 4/1964 | Gage et al. | 219/121 PN X |
| 3,489,876 | 1/1970 | Haase et al. | 219/121 PQ |
| 3,601,578 | 8/1971 | Gebel | 219/121 PN |
| 4,032,744 | 6/1977 | Goucher | 219/121 PN |
| 4,309,590 | 1/1982 | Stol | 219/137.62 |

*Primary Examiner*—M. H. Paschall

*Attorney, Agent, or Firm*—F. L. Masselle; E. T. Grimes; J. D. Crane

[57] ABSTRACT

A heavy duty plasma spray gun for extended industrial service is disclosed. The gun includes a gas distribution member made of a material having a coefficient of expansion different from that of the parts surrounding it. The gas distribution member is forcibly urged by a resilient member such as a coiled spring against a seal so as to assure the plasma gas is introduced into the gun arc in a manner only defined by the gas distribution member. The gun has liquid cooling for the nozzle (anode) and the cathode. Double seals are provided between the coolant and the arc region and a vent is provided between the seals which provides an indication when a seal has failed. Some parts of the gun are electrically isolated from others by an intermediate member which is formed as a sandwich of two rigid metal face pieces and an insulator disposed between them. The metal face pieces provide a rigid body to attach the remaining parts in proper alignment therewith.

9 Claims, 7 Drawing Figures

HEAVY DUTY PLASMA SPRAY GUN

BACKGROUND OF THE INVENTION

The present invention relates to the field of plasma spray guns and particularly to a plasma spray gun designed to be very rugged and suitable for extended high power operation.

In typical plasma flame spraying systems, an electrical arc is created between a water cooled nozzle (anode) and a centrally located cathode. An inert gas passes through the electrical arc and is excited thereby to temperatures of up to 30,000° F. The plasma of at least partially ionized gas issuing from the nozzle resembles an open oxy-actylene flame. A typical plasma flame spray gun is described in U.S. Pat. No. 3,145,287.

The electrical arc of such plasma spray guns, being as intense as it is, causes nozzle deterioration and ultimate failure. One cause of such deterioration is the fact that the arc itself strikes the nozzle at a point thereby causing instantaneous local melting and vaporizing of the nozzle surface. Deterioration is also caused by overheating the nozzle to the melting point so that part of the nozzle material flows to another location, which may eventually cause the nozzle to become plugged. There are varying degrees and rates associated for each cause for nozzle deterioration. Experience has shown that wall erosion, ultimately causing the coolant to burst through the nozzle wall, is another cause for nozzle failure. When the wall bursts, coolant water is released into the arc region, resulting in an intense electric arc, causing parts to melt. Once a meltdown has occured, gun repair can be very costly. The nozzle deterioration and failure problem is particularly severe at high power levels.

In seeking to overcome this problem, plasma flame spray guns have been designed with easily changed water cooled nozzles. During operation, water coolant is pumped through passages in the nozzle to cool the nozzle walls. Even so, gradual, or sometimes rapid deterioration occurs and, as a precaution against failure, the nozzles are usually replaced after a given number of hours of service. This practice of replacing the nozzle periodically, however, is quite costly because the interchangeable nozzles are fairly expensive and many nozzles with considerable life remaining are thereby discarded.

Another cause of failure is believed to be the fact that the gun parts are placed under more stress in extended service applications causing them to warp resulting in uneven wear, possible water leakage and more rapid failure. A similar problem is distortion of the gun during re-assembly, resulting from inadvertent over- or under-tightening of the bolts that hold the gun parts together.

One particularly troublesome mode of failure in all plasma spray guns is caused by coolant leakage. This typically occurs when a seal between a coolant passage and the plasma passage fails. When this occurs, the cooling fluid enters the region where the arc is produced, causing an electrical short circuit which usually results in a meltdown of gun parts. Even a minor leak upsets the arc operation resulting in rapid deterioration of the cathode and anode. A costly repair is thereafter required to again place the gun into service.

In view of the above-mentioned problems associated with prior art plasma spray guns when placed into heavy duty operation, it is the primary object of the present invention to provide a plasma spray gun capable of extended operation.

It is another object of the present invention to provide a heavy duty plasma spray gun capable of extended operation which requires relatively little routine maintenance to prevent failures.

It is yet another object of the invention to provide a heavy duty plasma spray gun with a readily perceptible indication to operators that an internal leak in the cooling system has occurred and that there is a danger of a meltdown due to that leak.

It is still a further object of the invention to provide a heavy duty plasma spray gun with rugged construction to prevent heat distortion of the gun parts during extended operation.

It is yet another object of the invention to provide a mechanism to assure that possible debris and cooling fluid do not enter the inert gas delivery system of the gun thereby preventing damage which might be caused thereby.

BRIEF DESCRIPTION OF THE INVENTION

The heavy duty plasma spray gun of the present invention includes a nozzle with a coolant passage through which a coolant fluid is forced at a sufficient rate to minimize nozzle deterioration. A further coolant passage is provided within the gun cathode for particularly delivering cooling fluid to the tip of the cathode to minimize cathode deterioration.

Each of the coolant passages of the gun are separated from the region where the arc is formed by a double seal arrangement with a vent to the gun exterior from between the two seals. In this way there is a redundancy in the seals thereby improving reliability. The vent provides a visually perceptible stream of cooling fluid when the seal between the vent and the cooling passage fails thereby alerting the operator of a seal failure. The seal redundancy and vent arrangement reduces the likelihood of a meltdown failure or reduced nozzle life occurring before the operator can repair a broken seal.

The inert gas delivery system is protected by a strainer and a check valve. The strainer and valve prevent debris and liquid from entering the gas delivery line.

The gun parts are all designed to withstand extended exposure to the heat experienced thereby without damage or warping. The parts are also designed to precisely interfit with other parts so that they are aligned properly to prevent uneven wear or premature coolant leaking.

The above-mentioned and other objects, advantages and features of the present invention are described below in greater detail in connection with drawings wherein.

DETAILED DESCRIPTION OF THE INVENTION

Figure 1:
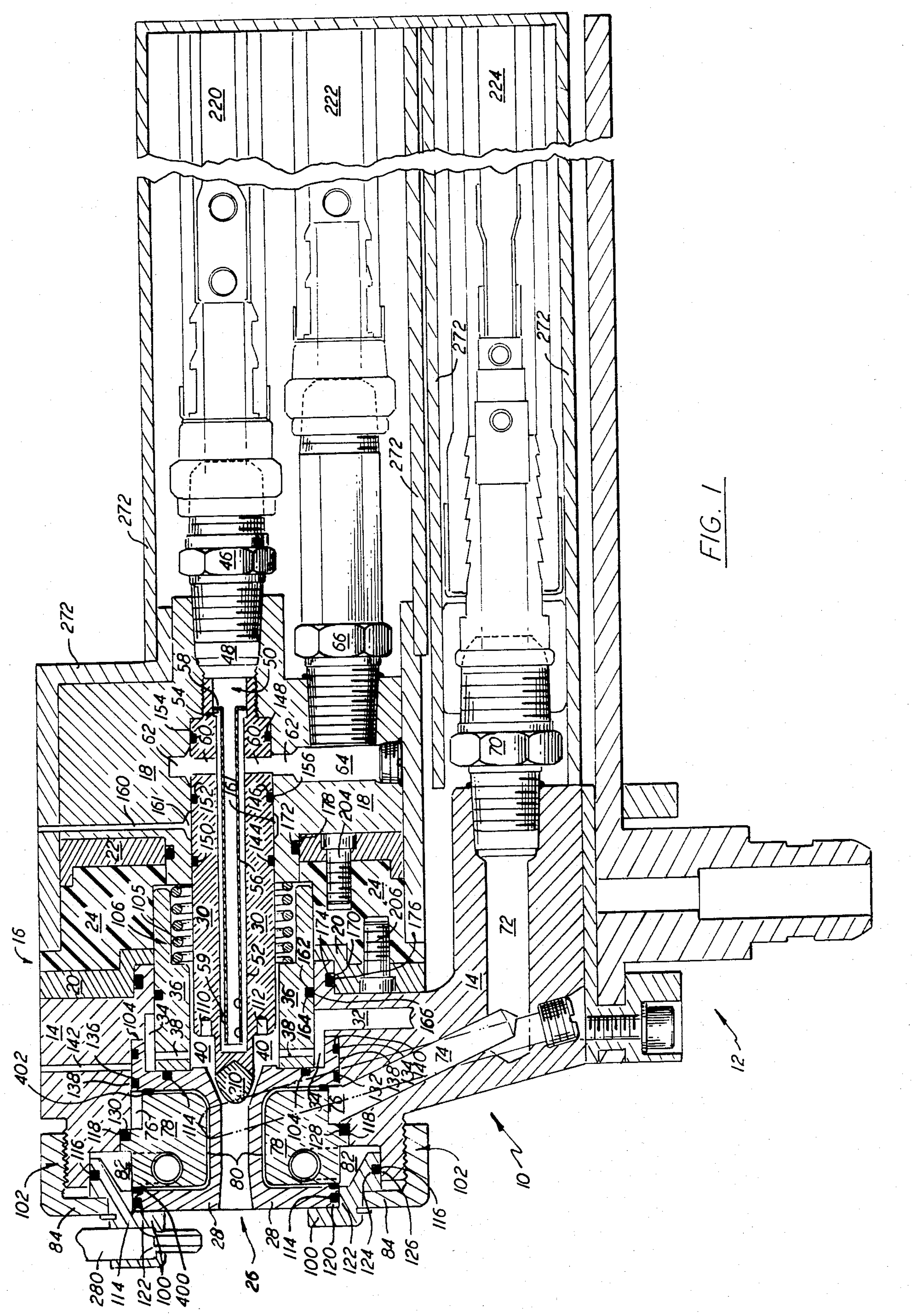
FIG. 1 is a sectional view through the plasma spray gun of the present invention; along section line A—A of FIG. 2.

Referring first to FIG. 1, a plasma spray gun, indicated generally at 10, is mounted on a spray gun support indicated generally at 12.

Figure 2:
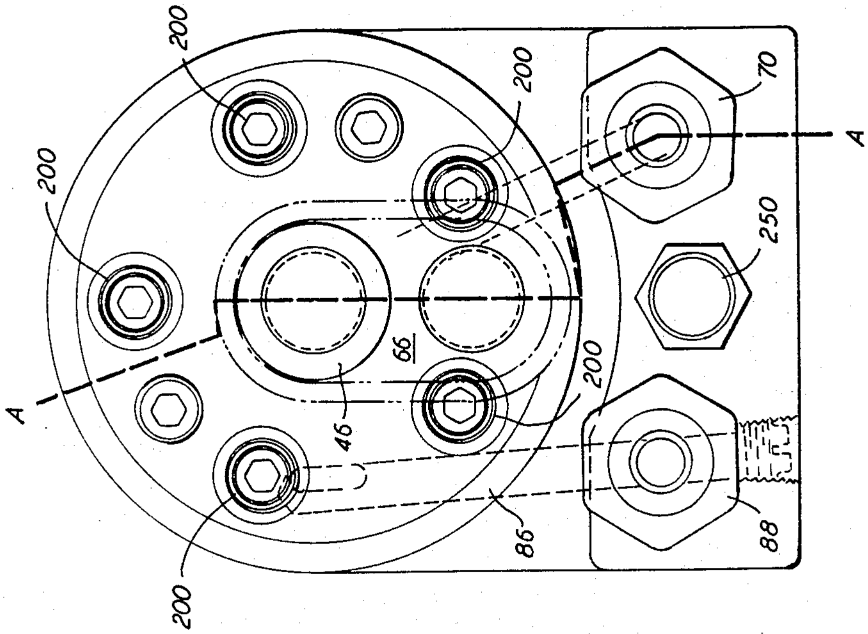
FIG. 2 is a rear view of the spray gun of FIG. 1.

The plasma spray gun 10, as illustrated in the FIG. 1 has been drawn along section line A—A of FIG. 2 in a manner to illustrate the parts of the gun 10. The gun itself is comprised primarily of three bodies, a forward gun body 14, a middle gun body indicated generally at 16 and a rear gun body 18. The middle gun body, as is described later in greater detail, is made of a sandwich having three layers wherein the forward face piece 20 and the rear face piece 22 are made of metal, and the inside layer 24 is made of an electrically insulating material.

In operation, the plasma spray gun 10 causes a plasma flame to be issued out of the central opening 26 of the plasma gun nozzle 28. The plasma flame itself is produced in the gun by passing an inert gas, such as nitrogen or argon sometimes combined with a secondary gas, such as hydrogen or helium, through an electrical arc formed between the cathode 30 and the plasma gun nozzle 28. The inert gas is introduced into the gun via a radially directed passageway 32 which couples at its bottom end (not shown in FIG. 1) to a gas supply source in a manner which is described hereinafter in greater detail, and at its upper end to an annular passage 34 which encircles a generally cylindrically-shaped gas distribution member 36. The inert gas passes through at least one and preferably a plurality of radially directed gas distribution passages 38 which pass through the gas distribution member 36 and into an annularly-shaped gas distribution chamber 40 which encircles the tip portion 42 of the cathode 30. From the gas distribution chamber 40, the gas flows between the tip portion 44 and the nozzle 28 and exits through the central opening 26. When an electrical arc is formed between the tip portion 44 and the nozzle 28, the gas molecules become excited so that a plasma flame issues from the central opening 26.

Due to the intense heat generated by the plasma flame issuing from the central opening 26, the spray gun 10 must be cooled by a cooling fluid such as water, which is directed through cooling passages formed within the gun 10 for this purpose. In accordance with the present invention, two separate cooling systems are provided, one of which serves to cool the tip 210 of cathode 30, and the second cooling system serves to cool the nozzle 28. The cathode cooling system includes a fluid coupling 46, which may be threaded or otherwise attached to the rear of the rear gun body and communicates through a passage 48 to a centrally located opening indicated at 50 in the rear of to the rear of the tip portion 44. The bore 52 has a slightly smaller diameter than the opening 50 so as to create a small lip at 54. A longitudinally extending tube 56 is fitted into the bore 52 and has a diameter somewhat less than that of the bore 52. At the rearmost end of the tube 56, the tube is flared outwardly to form a flange 58 which engages the lip 54. At the end nearest the tip 210, the tube 56 has projections 59 which help center the tube 56 inside the bore 52. In this manner, cooling fluid, such as water, which is pumped into the gun via the coupling 46 will pass through the passage 48 into the opening 50 and then down the center of the tube 56. The cooling fluid then exits the tube at the end nearest the cathode tip 210 and flows toward the rear of the gun between the outer wall of the tube 56 and the wall of the bore 52. Eventually, the cooling water is directed in a radial direction by the radial passages 60 through the cathode 30 until it reaches an annularly-shaped passage 62 which is formed along the inner wall of the rear gun body 18. The passage 62 couples via a further passage 64 to a second fluid coupling 66 which is also threaded into the rear of the rear gun member 18. Accordingly, a fluid passage is defined between the fluid coupling member 66 and 46 for cooling the cathode 30.

The nozzle cooling system includes a coupling 70 which may be threaded or otherwise attached to the rear of the forward gun body 14 and communicates with an internal passage 72 which is arranged in a direction generally parallel to the cathode 30. The internal passage 72 then couples to a generally radially directed passage 74 which communicates at its uppermost end with an annularly-shaped passage 76 formed between the forward gun body 14 and a coolant passage forming body 78 which is described hereinafter in greater detail. The passage forming body 78 forms a thin passage 80 between itself and the nozzle 28 which communicates between the passage 76 and a further annular passage 82 which is formed between the passage forming member 78, the forward gun body 14 and a nozzle retainer 84. The passage 82 then communicates via an internal passage 86 (FIG. 2) to another coupling 88 which is threaded into the rear of the forward gun body 14 in the same manner as is coupling 70. Accordingly, a water cooling passage is formed between the coupling 70 and the coupling 88 which permits cooling water to pass through the passages 72, 74 and 76 to the thin passage 80. From the end of the passage 80, the fluid flows into the passage 82 and then via the passage 86 to the coupling 88. It is also possible, by reason of the fact that fluid can be pumped through these passages in the reverse direction, to force the fluid from the coupling 88 to the coupling 70.

All of the parts of the plasma spray gun 10 which are subject to being replaced due to deterioration thereof during normal operation of the spray gun 10 have been designed to interfit with the other members so they can easily be removed from the front of the gun itself. The retainer ring 84 is designed with a flange portion 100 which comes in contact with the front face of the nozzle 28. The retainer ring 84 also has a threaded portion indicated generally at 102 which engages threads on the forward gun body 14. Accordingly, the retainer ring 84 can be threaded onto the forward gun body 14 in the manner shown in FIG. 1 thereby retaining the nozzle 28 in the position shown. Rearward motion of the nozzle 28 is prevented by reason of the fact that the rear surface of the nozzle located at 104 bears against a forward facing surface of the forward gun body 14. When the retainer 84 is unscrewed from the forward gun body 14, however, the nozzle 28 can be withdrawn in a forward direction from the gun body 14 so it may be replaced, if replacement is warranted.

On removing the nozzle 28 from the plasma gun 10, the forward surface of the gas distribution member 36 is exposed so that it may be removed easily. As seen in FIG. 1, the gas distribution member 36 has a pocket 106 on its inner rear surface for receiving a resilient means in the form of a coiled compression spring 105 or other type of spring. This spring 105 bears at one end against the forward surface of the rear gun body 18 and at its other end against the forward surface of the pocket 106.

This spring 105 serves, when the gun 10 is completely assembled, to forcibly urge the gas distribution member 36 in a direction toward the nozzle 28 so as to provide pressure against the rear surface of the nozzle, thereby maintaining a seal with the O-ring 109, which is located in an annular groove on the rear surface of the nozzle 28. A purpose of this seal is to assure that the gas entering the gas distribution chamber 40 comes through the radially directed gas distribution passage(s) 38 in the gas distributor member 36 as opposed to flowing from the passage 34 around the forward face of the gas distribution member 36 and into the chamber 40. The coiled spring 105 also compensates for the fact that the gas distribution member, being made of an insulating material, has a different coefficient of expansion then the parts surrounding it.

Once the nozzle 28 and the gas distribution member 36 have been removed from the gun 10, easy access for removal of the cathode 30 is provided. As viewed in FIG. 1, the forward end of the cathode 30 has two spanner wrench holes 110 and 112. When a spanner wrench is inserted into these holes 110 and 112, the cathode can be unthreaded from the rear gun body 18.

As will be recognized by those of skill in the art, the most frequently replaced items of a flame spray gun of the type shown in FIG. 1 are the nozzle element and the cathode. Because of the design as has been described, both of these elements can be removed from the gun from the front without completely disassembling the gun itself. Accordingly, routine maintenance on the gun can be performed quickly and easily.

The heavy duty plasma spray gun 10 of FIG. 1 includes a plurality of O-ring seals between various elements to provide isolation between the cooling passages and the gas flow passages as well as isolation from the outside so that both the cooling fluid and the gas used in the gun will flow only in the passages desired. In order to accomplish this objective with respect to the passage 82, for example, three isolating O-rings 114, 116 and 118 are provided. The O-ring 114 sits in an annular groove 120 formed in the nozzle 28 and bears against the surface 122 of the retainer ring 84 thereby preventing cooling fluid flowing from the passage 82 along the surface 122 and eventually to the exterior of the gun. The O-ring 116 sits in an annular groove 124 which is formed in the retainer ring 84 and bears against the surface 126 of the forward gun body 14, thereby preventing fluid from passing from the passage 82 over the surface 126 to eventually cause a leak by way of the threads at 102 and at the inside of the retaining ring 84. The O-ring 118 rests against flange 304 and bears against the surface 130 of the forward gun body 14, thereby preventing fluid from passing between the passage 82 and the passage 74.

Two further O-rings 132 and 134 are provided to prevent the cooling fluid from leaking out of the passage 76, along the boundary between the nozzle 28 and the forward gun body 14 into the gas passage 34. The double O-ring arrangement adds redundancy to this protection which is highly desirable because if the cooling fluid enters the gas distribution passage 34, it will eventually pass into the region where the arc is formed, thereby causing a short circuit which will severely damage the gun parts and perhaps cause the parts to melt.

The O-ring 132 rests in an annular groove 136 in the nozzle 28 and makes contact with the surface 138 of the forward gun body 14. The O-ring 134 is located in an annular groove 140 in the nozzle 28 and also bears against the surface 138. Located between the two O-rings 132 and 134 is a vent hole 142 passing through the forward gun body 14 and extending from the wall 138 to the exterior of the gun. This vent hole 142 provides a way to channel cooling fluid out of the gun in the event that the O-ring 132 fails. This reduces the fluid pressure on the junction between the O-ring 134 and the surface 138 thereby reducing the likelihood that a leak will occur between the cooling passage 76 and the passage passage 34. In addition, by reason of the fact a leak, should it occur, around the O-ring 132 is vented via the vent 142 to the outside, any operator is likely to see the fluid leaving the vent 142 and would immediately be alerted to the failure of the O-ring 132. Accordingly, the gun can be shut down and appropriate repairs made before a meltdown could occur. It is also possible that electronic or other means can be used in association with the vent 42 to automatically detect when a failure of the O-ring 136 has occurred and to shut the gun down before a meltdown occurs.

In connection with the cathode cooling system, several O-rings 144, 146 and 148 are located respectively in annular grooves 150, 152 and 154 located on the exterior surface of the cathode 30. These O-rings 144, 146 and 148 bear against the interior surface 156 of the rear gun body 18 to prevent the fluid from leaking from the cathode coolant passages.

The O-rings 144 and 146 provide redundancy to reduce the likelihood of fluid leaking from the cathode cooling passages 60 along the wall 156 and eventually into the passage 40 by way of the gap between the cathode and either the spring 105 or the gas distribution member 36. Located between the two O-rings 144 and 146 is a second vent 160 which communicates from an annular groove 161 in the surface 156 to the exterior of the gun. In the event that O-ring 146 fails, the cooling fluid will be vented to the exterior of the gun by way of the vent 160.

In addition to the O-rings 109 and 134, a further O-ring 162 is provided in an annular groove 164 located in the exterior surface of the gas distribution member 36 to prevent gas from leaking from the passage 34 along the exterior surface of the gas distribution member 36 and eventually into the passage 40. This O-ring 162 bears against the surface 166 of the forward gun body 14 to accomplish this objective.

As an added leak preventing feature, O-rings 170 and 172 are provided to prevent leaks of either gas or fluid along the surface respectively between the middle gun body 16 and the forward gun body 114 and the middle gun body 16 and the rear gun body 18. The O-ring 170 is located in an annular groove 174 formed in the forward gun body 14 and bears against the surface 176 of the forward face piece 20 of the middle gun body 16. The O-ring 172, on the other hand, bears against the surface 178 of the rear face piece 22 of the middle gun body 16. Accordingly, a leak preventing seal is provided on opposite sides of the middle gun body 16 to prevent either gas or fluid leaks which might develop interior to the gun from passing to the gun exterior along the interface between the middle gun body 16 and either the forward gun body 14 or the rear gun body 18.

The elements of the plasma spray gun 10 as shown in FIG. 1 are held together as shown. The manner of holding these elements together is shown in part in FIG. 4 which shows a bolt 200 which passes through the bodies 20, 24, 22 and 18 and threadably engages the forward gun body 14. By tightening the bolt 200, the forward gun body 14, the middle gun body 16 and the rear gun body 18 are held together. As viewed in FIG. 2, there are five such bolts 200 equally spaced around the arrangement of FIG. 1 to hold the gun body members together.

Since the forward gun body 14 must be electrically insulated from the rear gun body 18 in order to permit the cathode 30 to be at a different electrical potential than the anode 28, an insulating sleeve 202 is provided to electrically isolate the bolt 200 from the rear gun body 18 as well as from the rear outside layer 22, both of which elements are made of a metal which is electrically conductive, such as brass. Since the insulating sleeve overlies all of the metal surfaces of the rear gun body 18 and the rear outside layer 22 which the bolt 200 might come in contact with, this electrical isolation between the rear gun body 18 and the forward gun body 14 is achieved.

Figure 4:
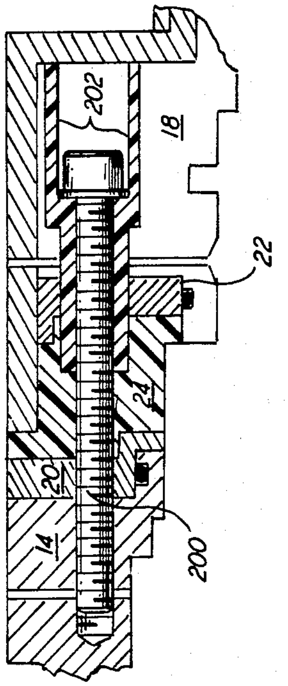
FIG. 4 is a partial sectional view taken through part of the middle gun body to show how the forward and rear gun bodies are coupled thereto.

The middle gun body itself is held together by a plurality of screws such as screws 204 and 206 as illustrated in FIG. 4. The screw 204, for example, passes through the rear outside layer 22 and threadably engages the inside layer 24. In a similar manner, the screw 206 passes through the forward face piece 20 and threadably engages the middle layer 24. A plurality of screws such as 204 are provided, one being shown, to secure the rear face piece 22 to the inner layer 24. Likewise, a plurality of screws such as 206 are provided to secure the forward face piece 20 to the inside layer 24. By providing a sandwich configuration of this sort, the middle gun body 16 becomes extremely rigid, it provides metal to metal surfaces for precisely aligning the forward gun body with the middle gun body 16 as well as aligning the rear gun body 18 with the middle gun body 16. Further, since the middle layer 24 is an electrical insulator, the forward gun body 14 and the rear gun body 18 are electrically insulated from each other.

Further details of the nozzle assembly of the gun 10 deserve note. The nozzle 28, as previously noted, is preferably made of a material such as substantially pure copper or any other material having similar electrical and thermal conductivity characteristics. The passage forming member 28 which cooperates with the nozzle 28 to form a coolant passage 80 therebetween is also deserving of special note and is shown in greater detail in FIGS. 5–7. As noted, the passage forming member 78 may be constructed of a metal such as aluminum, or it may be fabricated out of plastic or other suitable material which can be formed into the shape of the elements shown in FIGS. 5–7.

Figure 7:
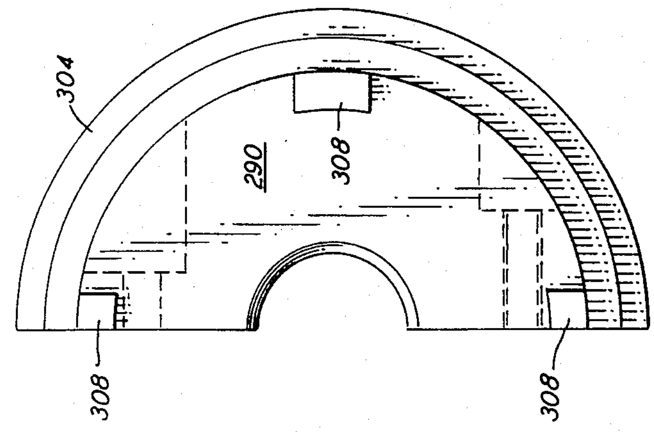
FIGS. 5–7 show several views of the coolant passage forming member.
Figure 5:
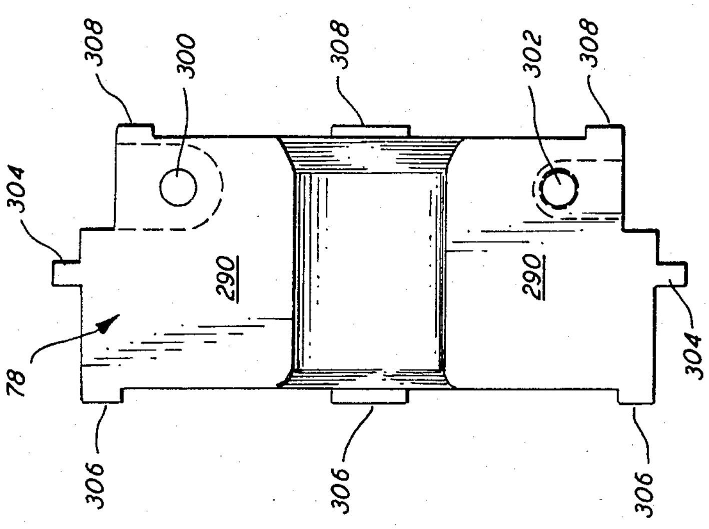
Figure 6:
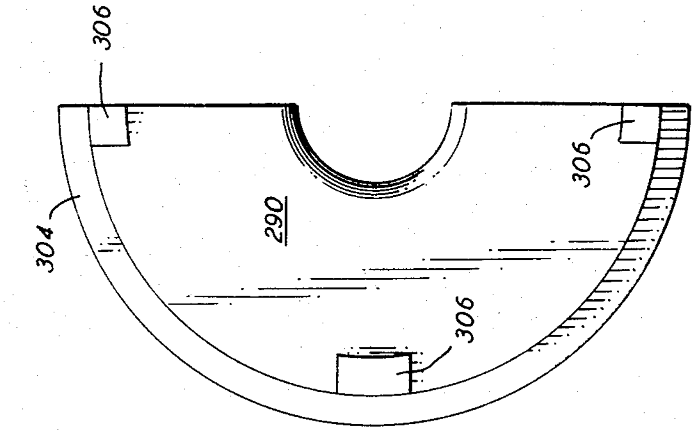

Referring now to FIGS. 5–7, the body 78 is preferably made of two identical half doughnut-shaped bodies 290 made of plastic or perhaps of a metal such as aluminum which are bolted together by bolts disposed in bolt holes 300 and 302. The hole 300 permits a bolt to pass therethrough and engage the threads in the hole 302 of the other half doughnut-shaped body 290. By using two such bolts, the two half doughnut-shaped bodies 290 are held together to form the annular passage forming body 78.

Each body 290 has a radially projecting flange 304 whose rear surface engages an O-ring 118 when assembled into a gun as illustrated in FIG. 1. Each body 290 also has a plurality of forward projections 306 and a plurality of rear projections 308. These projections 306 and 308 serve to position the body 78 in the forward and rear direction, as well as the radial direction, as viewed in FIG. 1. The projections 306 fit into pockets 400 formed in the nozzle 28 and the projections 308 fit into pockets 402. Accordingly, the body 78 is restrained from movement in the forward or rear direction and fixed in the radial direction. As such, a passage 80 is formed between the body 78 and the nozzle 28 which allows cooling fluid to flow therethrough to cool the nozzle 28.

The details of the gas distribution member 36 also bear some attention. This member 36 is made of an insulating material and preferably of alumina or a machinable ceramic such as Macor (trademark), manufactured by Corning Glass Works, Corning, New York. The insulating characteristics are necessary in order to provide electrical isolation between the cathode 30 and the nozzle 28, which forms the anode of the spray gun 10. The machinable characteristic is desirable in order to readily shape the gas distribution member 36 to that shown in FIG. 1.

The cathode 30 itself has some unique characteristics as well. The cathode is preferably made of substantially pure copper with the exception of the cathode tip 210 which is preferably made of thoriated tungsten, which has been found to improve the cathode life.

Electrical power is supplied to the plasma spray gun by way of the coolant delivery hoses. These hoses are of a semi-rigid nature and have a stranded copper cable or the like inside the hose. This cable is connected to the gun power supply. The negative power connection is provided by way of the pipes 220 and 222. The pipes 220 and 222 couple respectively to couplings 46 and 66 thereby providing negative power to the rear gun body 18 and the cathode 30 which is threaded into the body 18. In a similar manner, cooling fluid carrying pipe 224, which couples to connection 70, provides coolant for the nozzle, as well as positive electrical power therefor. A further coolant carrying hose with cable (not shown) couples to connector 88 and provides a further electrical power connection for the nozzle. The current carried by the power connections to the gun 10 is extremely high, and this has a tendency to heat the cable in the fluid coupling hoses. Having two fluid hoses with cable to carry this power helps reduce the problem of conductor heating due to the high current carried thereby. Advantageously, cooling fluid flows through the hoses to the gun during operation, and this operates to cool the power delivery system to the gun as well as the gun parts.

Figure 3:
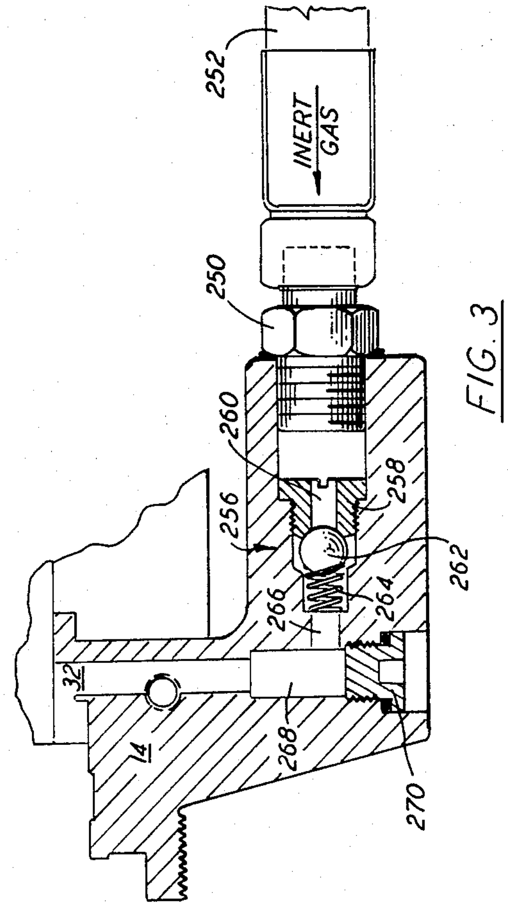
FIG. 3 is a longitudinal sectional view through the central lower part of the forward gun body to illustrate part of the inert gas delivery system.

As indicated at the outset of the discussion, the present invention includes means for preventing either debris or fluid from getting into the gas delivery system. This arrangement is shown in FIG. 3, which includes a gas coupling 250 which is connected to a gas delivery pipe 252 which is connected to an external gas storage tank containing an inert gas such as nitrogen or argon or other conventional gas used in plasma spray guns of the type under discussion. The coupling 250 is threaded into or otherwise attached to the forward gun body 14.

A check valve arrangement shown generally at 256 is provided within the forward gun body 14 or optimally outside the gun. Other available check valve arrangements may also be used. The illustrated check valve 256 is a threaded member 258 which engages the forward gun body 14. A central passage 260 is provided through the member 258 thereby allowing gas to flow from the gas connector 250 until it contacts the check valve ball 262 which is forced toward the member 258 by a compression spring 264. When the gas delivery system is turned on, allowing the gas pressure to increase in the delivery pipe 252, once the pressure is sufficient to displace the valve ball 262 away from its seated position as shown in FIG. 3, the gas flows into the passage 266. The gas then flows through a strainer 268, located at the bottom of the passage 32 in the forward gun body 14 and upwardly through the passage 32 and into the region where the arc is formed.

A threaded plug 270 is provided at the bottom of the passage 32 to permit access thereto for cleaning it, as well as to provide a means to retain the strainer 268 within the passage 32.

In the event that the gas is turned off, the spring 264 will then force the check valve ball 262 against the member 258, thereby sealing the gas delivery line from the passage 32. This is particularly important in the event of a meltdown in the gun, which typically may cause metal particles and cooling fluid to enter the passage 32. Electronic circuitry or other elements usually detect the meltdown condition, and immediately cut off electrical power and the gas supply to the gun. Experience has shown, however, that cooling fluid and debris may enter the passage 32 when even a partial meltdown occurs. The check valve 256 prevents any fluid or metal chips from entering the gas distribution system. The strainer 268 prevents any debris entering the passage 32 from entering the gas distribution system as well. The threaded member 270 permits access to the passage 32 thereby permitting it to be cleaned out should such be required.

Referring again to FIG. 1, as a safety feature, the rear surfaces of the gun 10 are protected by insulating members 272. These members serve to protect operators of the gun from coming in contact with the electrical power connections supplied to the gun by way of the coolant delivery tubes as described above and also serve to prevent these tubes from coming in contact with each other or other metal objects. Other insulating arrangements can be used as well.

While the foregoing invention has been described with particular attention being paid to the embodiment shown in the drawings, those of skill in the art will readily recognize that modifications of design can be made to many of the elements while still maintaining the overall configuration and practicing the invention as defined in the claims.

What is claimed is:

1. A plasma spray gun comprising, in the combination:

a gun nozzle located close enough to said electrode so that an arc can be formed between said electrode and said nozzle;

a source of gas;

a gas distribution member disposed between said source of gas and the region where said arc is formed;

means to cool said gun and said electrode;

said cooling means comprising a cooling passage surrounding said nozzle and being bounded by said nozzle and a passage forming means;

said cooling means further comprising at least two sealing means disposed between said cooling passage and the region where said arc is formed to prevent coolant from entering the region where said arc is formed; and means disposed between said two sealing means to vent coolant to the exterior of the gun and away from the region where said arc is formed if one said sealing means fails.

2. A plasma spray gun comprising, in combination:

an electrode member;

a gun nozzle at a different electrical potential compared to the electrical potential of said electrode member, the potential difference between said electrode member and said gun nozzle being sufficient to form an arc therebetween;

a gas distribution member disposed between said plasma gas source and the region where said arc is produced, said gas distribution member including at least one gas passage to introduce said plasma gas uniformly into the region where said arc is formed;

means to prevent said gas from escaping around said distribution member and entering the region where said arc is formed from a path other than through said gas passage, said means to prevent gas from escaping includes at least one pliable sealing member disposed between said nozzle and said gas distribution member;

resilient means to forcibly urge said gas distribution member towards said nozzle thereby compressing said sealing member between said nozzle and said gas distribution member;

means to cool said nozzle and means to cool said electrode member; and two sealing means disposed between said means to cool said nozzle and the region where said arc is formed and a vent disposed between said two sealing means to vent any coolant which enters the region between said two sealing means to the gun exterior.

3. A plasma spray gun comprising, in combination;

an electrode member;

a plasma gas source;

a gun nozzle at a different electrical potential compared to the electrical potential of said electrode member, the potential difference between said electrode member and said gun nozzle being sufficient to form an arc therebetween;

a gas distribution member disposed between said plasma gas source and the region where said arc is produced, said gas distribution member including at least one gas passage to introduce said plasma gas uniformly into the region where said arc is formed;

means to prevent said gas from escaping around said distribution member and entering the region where said arc is formed from a path other than through said gas passage, said means to prevent gas from escaping includes at least one pliable sealing member disposed between said nozzle and said gas distribution member;

resilient means to forcibly urge said gas distribution member towards said nozzle thereby compressing said sealing member between said nozzle and said gas distribution member;

means to cool said nozzle and means to cool said electrode member; and two sealing means disposed between said means to cool said electrode member and the region where said arc is formed and a vent disposed between said sealing means to vent any coolant which enters the region between said two sealing means to the gun exterior.

4. The plasma spray gun of claim 1 additionally including means to detect that one said sealing means has failed.

5. The plasma spray gun of claim 1 including sealing means disposed between said gas distribution member and said nozzle to prevent gas flow around said gas distribution member; and
- resilient means to forcibly urge said gas distribution member toward said nozzle to compress said sealing means.

6. The plasma spray gun of claim 1 including an intermediate member, said electrode and said nozzle being rigidly coupled thereto to allow precise positioning of said electrode with respect to said nozzle, said intermediate member being comprised of two metal face pieces affixed to opposite sides of an insulator member disposed between said metal face pieces.

7. The plasma spray gun of claim 1 or 2 or 3 wherein said gas distribution member is made of a machinable ceramic material.

8. A plasma spray gun comprising, in combination:
- an electrode;
- a gun nozzle located close enough to said electrode so that an arc can be formed between said electrode and said nozzle;
- a source of gas;
- a gas distribution member disposed between said source of gas and the region where said arc is formed, said distribution member uniformly introducing said gas into the region where said arc is formed;
- a rear gun body supporting said electrode;
- a forward gun body supporting said nozzle;
- an intermediate gun member disposed between said forward gun body and said rear gun body and providing electrical isolation therebetween, said intermediate member being formed of an electrical insulator member sandwiched between two metal members to form a rigid body permitting said rear gun body and said forward body to be precisely positioned with respect to each other;
- means to cool said electrode, said electrode cooling means including a passage internal to said electrode to permit a cooling fluid to cool said nozzle; and
- two seals forming a double nozzle cooling seal disposed between said nozzle cooling means and said region where said arc is formed and also including a vent for communicating between the region between said seals which comprise said double nozzle cooling seal and the gun exterior.

9. A plasma spray gun comprising, in combination:
- an electrode;
- a gun nozzle located close enough to said electrode so that an arc can be formed between said electrode and said nozzle;
- a source of gas;
- a gas distribution member disposed between said source of gas and the region where said arc is formed, said distribution member uniformly introducing said gas into the region where said arc is formed;
- a rear gun body supporting said electrode;
- a forward gun body supporting said nozzle;
- an intermediate gun member disposed between said forward gun body and said rear gun body and providing electrical isolation therebetween, said intermediate member being formed of an electrical insulator member sandwiched between two metal members to form a rigid body permitting said rear gun body and said forward body to be precisely positioned with respect to each other;
- means to cool said electrode, said electrode cooling means including a passage internal to said electrode to permit a cooling fluid to flow through the interior of said electrode;
- means to cool said nozzle; and
- two seals forming a double nozzle cooling seal disposed between said nozzle cooling means and said region where said arc is formed and also including a vent for communicating between the region between said seals which comprise said double nozzle cooling seal and the gun exterior.

* * * * *